US010623410B2

(12) United States Patent
Leibmann et al.

(10) Patent No.: US 10,623,410 B2
(45) Date of Patent: Apr. 14, 2020

(54) MULTI-LEVEL, DISTRIBUTED ACCESS CONTROL BETWEEN SERVICES AND APPLICATIONS

(71) Applicant: Microsoft Technology Licensing, LLC, Redmond, WA (US)

(72) Inventors: Matthias Leibmann, Redmond, WA (US); Joel T. Hendrickson, Redmond, WA (US); Grigory V. Kaplin, Redmond, WA (US); Corneliu Manescu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 15/494,679

(22) Filed: Apr. 24, 2017

(65) Prior Publication Data

US 2018/0309759 A1 Oct. 25, 2018

(51) Int. Cl.
*H04L 29/06* (2006.01)
*H04L 29/08* (2006.01)

(52) U.S. Cl.
CPC .......... *H04L 63/10* (2013.01); *H04L 63/0815* (2013.01); *H04L 63/105* (2013.01); *H04L 67/10* (2013.01)

(58) Field of Classification Search
CPC .......... G06F 21/30; G06F 21/44; G06F 21/70; G06F 21/45; G06F 21/62; G06F 2221/2141; G06F 2221/2113; G06F 21/6209; H04L 63/10; H04L 63/101; H04L 63/08; H04L 63/0227; H04L 63/105; H04L 9/088; H04L 9/3213; H04L 29/06; H04L 41/28; H04L 63/0807; H04L 63/0853

USPC ...... 726/2, 4–7, 9, 13, 17–21; 713/150, 154, 713/164, 166, 182
See application file for complete search history.

(56) References Cited

U.S. PATENT DOCUMENTS

| | | | |
|---|---|---|---|
| 8,191,106 B2* | 5/2012 | Choyi | H04L 63/20 713/150 |
| 8,200,834 B2 | 6/2012 | Williams | |
| 8,296,828 B2* | 10/2012 | Dalzell | G06F 21/41 713/168 |

(Continued)

FOREIGN PATENT DOCUMENTS

WO  2015042349 A1  3/2015

OTHER PUBLICATIONS

"International Search Report & Written Opinion issued in PCT Application No. PCT/US2018/026378", dated Jun. 6, 2018, 11 Pages.

(Continued)

*Primary Examiner* — Saleh Najjar
*Assistant Examiner* — Khalid M Almaghayreh
(74) *Attorney, Agent, or Firm* — Christopher J. Volkmann; Kelly, Holt & Christenson, PLLC

(57) ABSTRACT

A computing system controls access between components. A token issuer issues an access token to a requesting component, that is requesting access to a requested service component, based at least in part on an access policy. The requesting component sends the token to the requested service component, which includes a token authentication module that validates the access token and authorizes the requesting component to access a requested service component, and receives the authorization to access the requested service component.

20 Claims, 9 Drawing Sheets

(56) References Cited

U.S. PATENT DOCUMENTS

| | | | |
|---|---|---|---|
| 8,397,290 B2 | 3/2013 | Coles et al. | |
| 8,782,748 B2 | 7/2014 | Olszewski et al. | |
| 9,264,449 B1 | 2/2016 | Roth et al. | |
| 9,374,356 B2* | 6/2016 | Sondhi | H04L 63/08 |
| 9,407,628 B2* | 8/2016 | Sondhi | H04L 63/0807 |
| 9,411,973 B2 | 8/2016 | Factor et al. | |
| 9,449,182 B1* | 9/2016 | Dang | H04L 51/04 |
| 9,501,635 B2 | 11/2016 | Chinta et al. | |
| 10,104,084 B2* | 10/2018 | Biggs | H04L 63/08 |
| 2001/0042213 A1* | 11/2001 | Jemes | H04L 29/06 726/3 |
| 2006/0206931 A1* | 9/2006 | Dillaway | G06F 21/6218 726/9 |
| 2011/0125894 A1* | 5/2011 | Anderson | H04L 9/3213 709/224 |
| 2016/0028737 A1* | 1/2016 | Srinivasan | H04L 63/0807 726/1 |
| 2016/0124742 A1* | 5/2016 | Rangasamy | H04L 47/70 717/103 |
| 2016/0344736 A1* | 11/2016 | Khait | H04L 63/0807 |
| 2016/0366188 A1 | 12/2016 | Smith et al. | |
| 2017/0019402 A1* | 1/2017 | Kulkarni | H04L 63/0807 |
| 2018/0026984 A1* | 1/2018 | Maker | H04L 67/10 726/4 |
| 2018/0077138 A1* | 3/2018 | Bansal | H04L 63/108 |
| 2018/0167384 A1* | 6/2018 | Raepple | G06F 21/335 |
| 2018/0300471 A1* | 10/2018 | Jain | G06F 21/6218 |
| 2018/0309759 A1* | 10/2018 | Leibmann | H04L 63/0815 |

OTHER PUBLICATIONS

"Google Cloud Storage Authentication", https://cloud.google.com/storage/docs/authentication, Retrieved on: Feb. 17, 2017, 10 pages.

"Obtaining an Access Token", https://msdn.microsoft.com/en-us/library/hh454950.aspx, Retrieved on: Feb. 17, 2017, 10 pages.

Blankstein, et al., "Automating Isolation and Least Privilege in Web Services", In Proceedings of the IEEE Symposium on Security and Privacy, May 18, 2014, 16 pages.

* cited by examiner

MULTI-LEVEL, DISTRIBUTED ACCESS CONTROL BETWEEN SERVICES AND APPLICATIONS

BACKGROUND

Computer systems are currently in wide use. Some such computer systems run applications that operate from a cloud system. Examples of such applications include document management and sharing systems, cloud-based data storage systems, services such as electronic mail (email) services, word processing applications that generate word processing documents, slide presentation applications that generate slide presentation documents, spreadsheet applications that generate spreadsheet documents, among a wide variety of others.

Such systems and applications often run on a cloud network that includes a variety of different services and resources. During operation of these systems and applications, they often access the different services and resources located on the network. Also, a developer who develops a new feature in the system or application may wish the new feature to have access to the services and resources, to ensure that the new feature works properly.

Due to the nature of these applications, where services and resources are located on a network, unrestricted access can pose a security risk to the whole system. However, an overly restricted system can lead to performance reduction of the whole system.

The discussion above is merely provided for general background information and is not intended to be used as an aid in determining the scope of the claimed subject matter.

SUMMARY

A computing system controls access between components. A token issuer issues an access token to a requesting component, that is requesting access to a requested service component, based at least in part on an access policy. The requesting component sends the token to the requested service component, which includes a token authentication module that validates the access token and authorizes the requesting component to access the requested service component, and receives the authorization to access the requested service component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
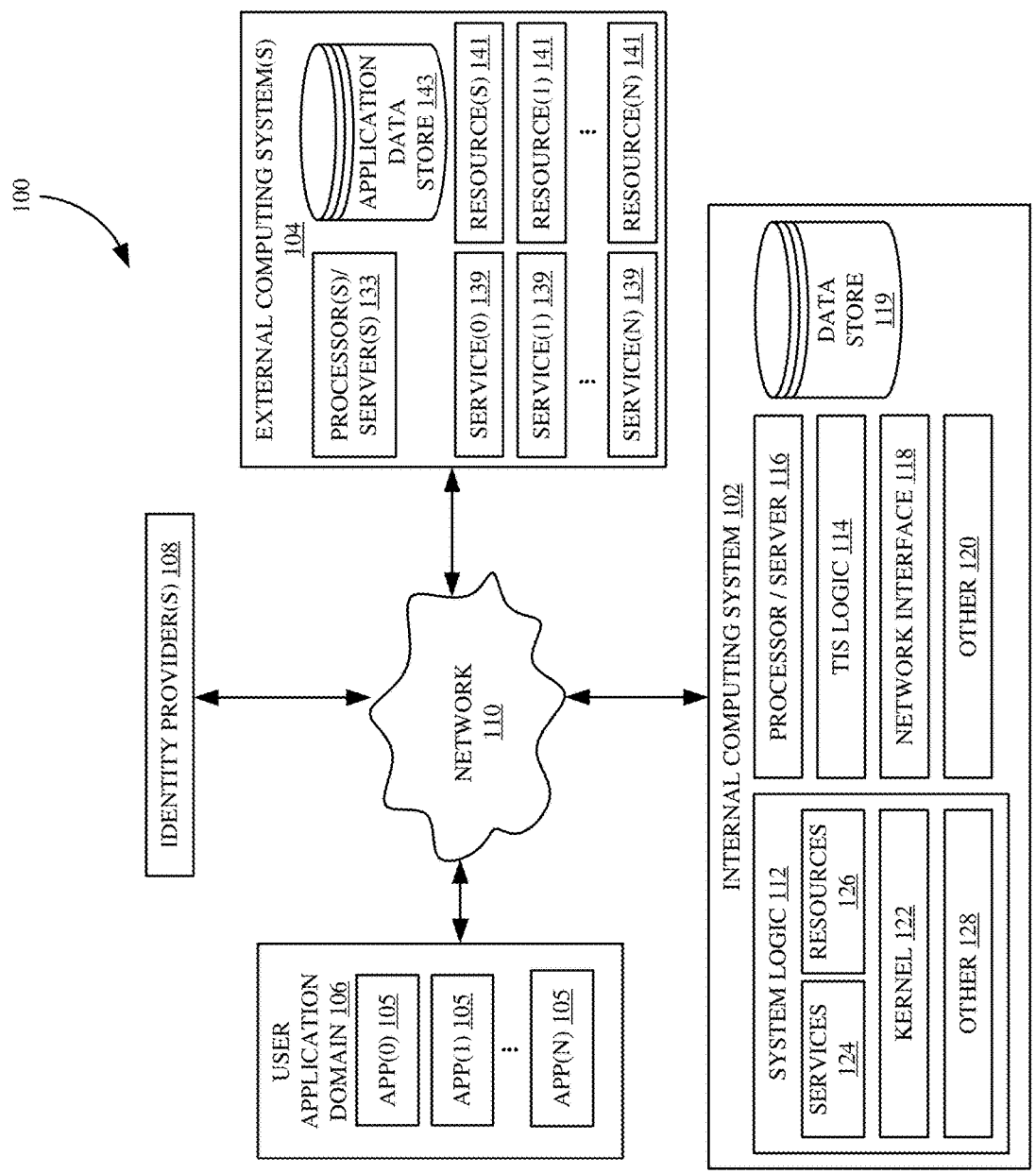
FIG. 1 shows a block diagram of one example of a computing system architecture.

FIG. 1 is a block diagram of one example of a computing system architecture 100. Architecture 100 includes internal computing system 102, external computing system 104, user application domain 106, and identity provider 108. The components of architecture 100 communicate with each other through network 110. Network 110 can be any of a wide variety of networks or combinations of networks such as a wide area network, a local area network, a near field communication network, a cellular network or other networks. Before describing the overall operation of architecture 100 in more detail, a brief description of some of the items in architecture 100, and their operation, will first be provided. In one example, internal computing system 102 includes system logic 112, token issue service (TIS) logic 114, processors/servers 116, network interface 118, data store 119, and other items 120. It is referred to as an internal system herein because the description will describe how services 124, which are developed on a substrate, or platform, provided by system 120, obtain access to other services 124 or resources 126 internal to system 102, and to external services and resources that may be running on any of a variety of external computing systems 104. System logic 112, itself, includes a set of services 124, resources 126 and kernel 122 (where core systems and functions are stored). User application (APP) domain 106 includes one or more applications (0-N) labelled 105. External computing system 104 can include one or more processors or servers 133, a set of services (0-N) labeled 139, a set of resources (0-N) labeled 141 and one or more data stores 143.

TIS 114 illustratively issues tokens to various items in internal computing system 102 in architecture 100 so those items can securely access one another and access external services 139 and resources 141. For example, the applications 105 in the user application domain 106, and the services 124, and resources 126 can call upon kernel 122, and one another, and upon, external services 139 and external resources 141 for access. Before access is granted to service 124 or, resource 126 a token is provided to the requesting service or resource. The requesting service or resource provides the token, along with an access request, to a requested component (e.g., a requested service or resource or kernel). The requested component receives and authenticates the token and grants access if the token is successfully authenticated. Tokens can be requested from TIS 114. For tokens, and thereby access, third-party applications 105 in user applications domain 106 can also receive identities from identity providers 108. For example, identity provider 108 can be an identify provider service that provides a unique identity to each user application. The application 105 can, for instance, call upon services 124 which acquire tokens to access other services or resources.

Network interface 118 illustratively manages all network accesses. It can do this in any of a wide variety of ways using a wide variety of different protocols.

Figure 2:
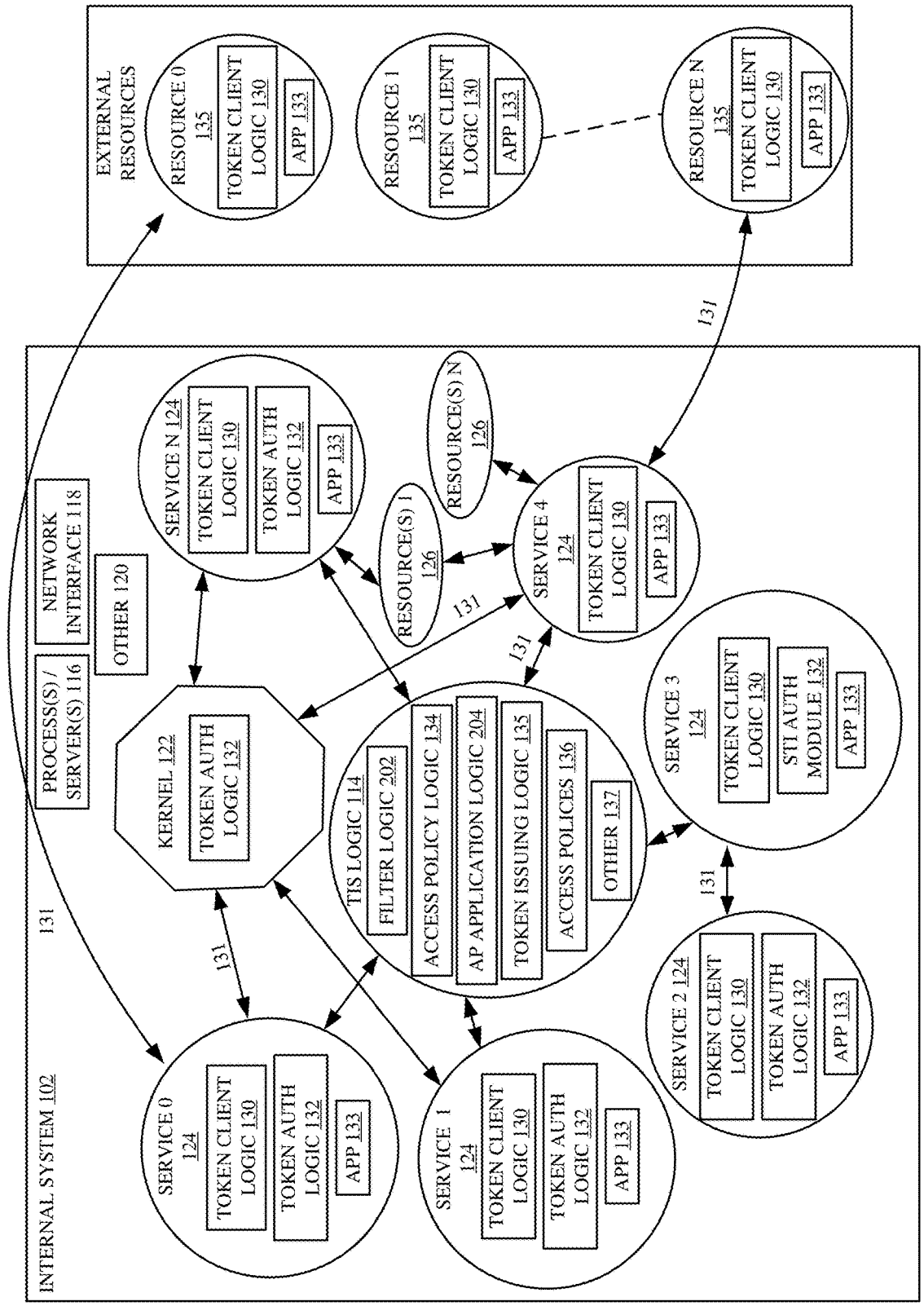
FIG. 2 is a block diagram and data flow diagram showing one example of token interactions in a computing system architecture.

FIG. 2 is a block diagram showing one example of internal computing system 102, in more detail, along with arrows indicating some possible communications or data flows. Internal computing system 102, in FIG. 2, is similar to that shown in FIG. 1 and similar items are similarly numbered. System logic 112, itself, includes services 124, resources 126, kernel 122 and other items 120. Services 124 can include any number of services (0-N), all of which are labeled 124. Services 124 can be narrowly defined services, for example a function. Services 124 can be more broadly defined services, for example a program or an application programming interface (API). Resources 126 can include any number of resources (1-N) 126. Resources 126 can be narrowly defined, for example a single variable. Resources 126 can also be more broadly defined, for example a data table or set of data tables, a document, an image, a database, etc. Kernel 122 contains the core functions and logic and/or application programming interface(s) (APIs) of system logic 112. It can also manage some input/output requests and translate them into data processing instructions for the computing system central processing unit in processors/servers 116 and other components of the computing system 102.

Processor(s)/server(s) 116 can implement the functions, logic, data calls, etc. of the previous components/logic. Internal computing system 102 uses network interface 118 to connect to network 110 and other systems. Internal computing system 102 is not limited to the components shown as indicated by other items 120. Some examples of other components are displays, input components, output components, etc.

The components of internal computing system 102 and the components of external computing system 104 can be interconnected to communicate with one another (either directly or indirectly, such as over a network). Connections 131 illustrate some examples of possible connections between the components. Connections 131 can be used to make service or resource access requests from one service or resource to another, between services and kernel 122 between services and resources 126 or external service 135 or resources 141. Connections 131 can represent token transfers as part of a request. In one example, token transfer connections 131 can be made over one or more protocols, such as via https or OAuth2.0, or other protocols.

As shown, some of the components can include application logic 133, token client logic 130 and/or token authentication logic 132. It will be appreciated that in some examples all services and resources in system 102 include all of these items. In other examples, only a subset include all of these items. These and other architectures are contemplated herein.

Application logic 133 provides the functions of a service 124 or an object of a resource 126 or other items. Token client logic 130 facilitates communications and interactions with TIS logic 114, such as making token requests to, and receiving tokens from, TIS logic 114. Token client logic 130 can also include logic for caching, timeout/re-entry policies and exception management. Token client logic 130 can also expose an API that can be used directly from applications, for example applications 105 on the user application domain 106 (in FIG. 1). Token authentication logic 132 can be used by the corresponding services to authenticate access tokens when they are received as part of an access request by another service. Therefore, logic 132 can run in an incoming request processing pipeline and check for tokens that are passed along with the request by the service callers. Token authentication logic 132 can validate items such as token signature, target audience, or other access policies, and it can also extract identity information and permissions used to create an identity object. That identity object can then be used in application logic 133 of the service to make authorization decisions.

TIS logic 114, itself, can include access policy (AP) logic 134, token issuing logic 135, access policies (or records) 136 (which can also be stored elsewhere) and other logic 137. AP logic 134, itself, can include filter logic 202 and AP application logic 204. It will illustratively stores AP records 136 for various services and runs compliance checks based on those AP records 136. A service 124 that wishes to access another service, for example. In response, filter logic 202 in AP logic 134 accesses the AP record for the requesting service. It will filter the AP records to identify one to apply. AP application logic 204 in AP logic 134 will then check the request for compliance with the identified AP record 136 and, if it is compliant, token issuing logic 135 issues a token to the requesting service. In one example, there is an AP record (or AP record file) corresponding to each service 124 that can make requests to TIS logic 114. The AP record 136 can also correspond to groups of services. One example of an AP record 136, for a service is shown below in FIG. 5. TIS logic 114, for security purposes, can run in a dedicated process, with its own identity and it may have access to only the resources it needs. TIS logic 114 can use certificates for token signing and secured communications. For security purposes, these certificates and their private keys can be managed by a secure certificate management system (not shown). In one example, the issued tokens can be JavaScript Object Notation (JSON) web tokens (JWT). They can be other tokens as well.

Figure 3:
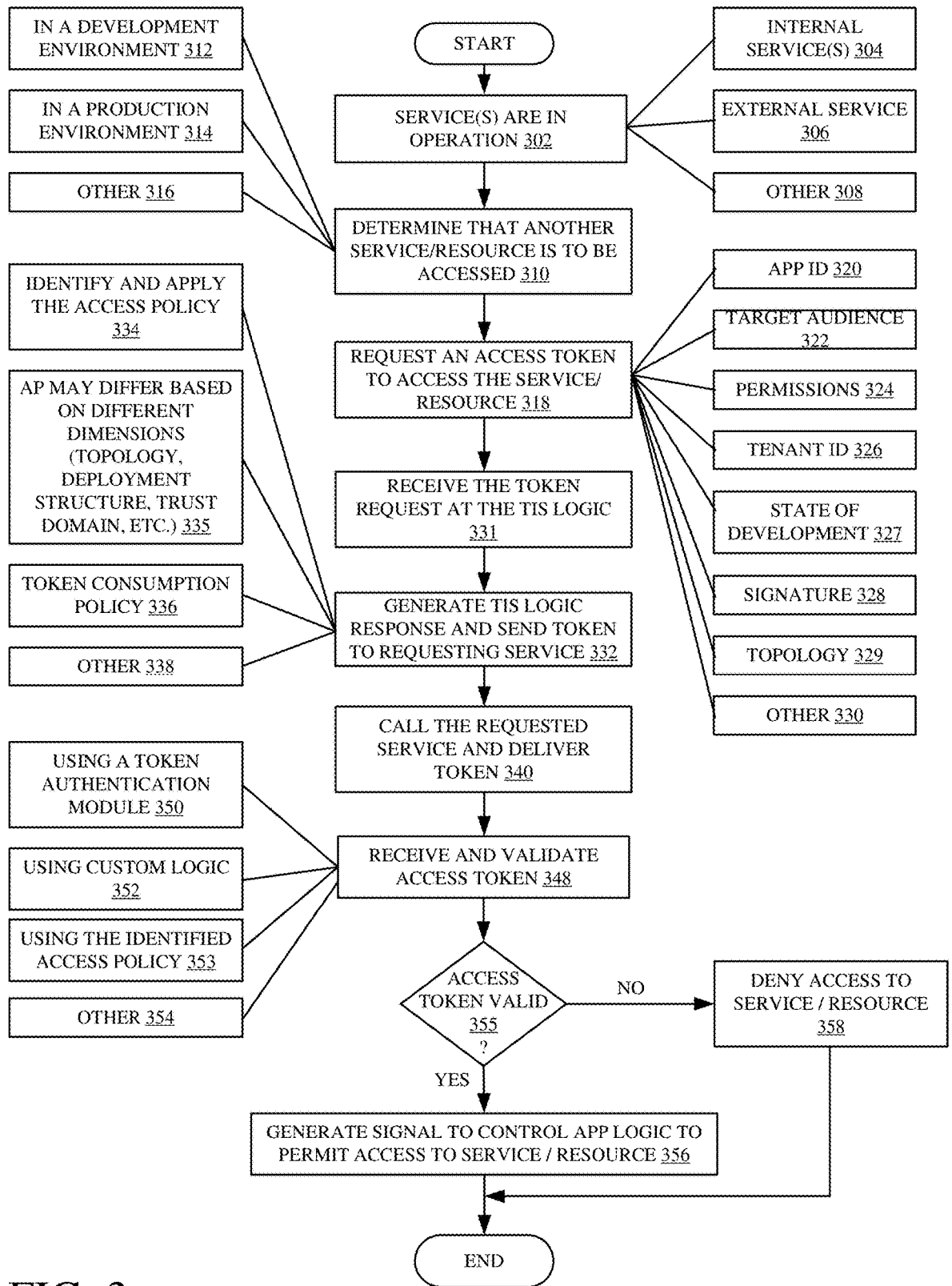
FIG. 3 shows a flow diagram of one example of token processing and permitting access to a requested service component.
Figure 4:
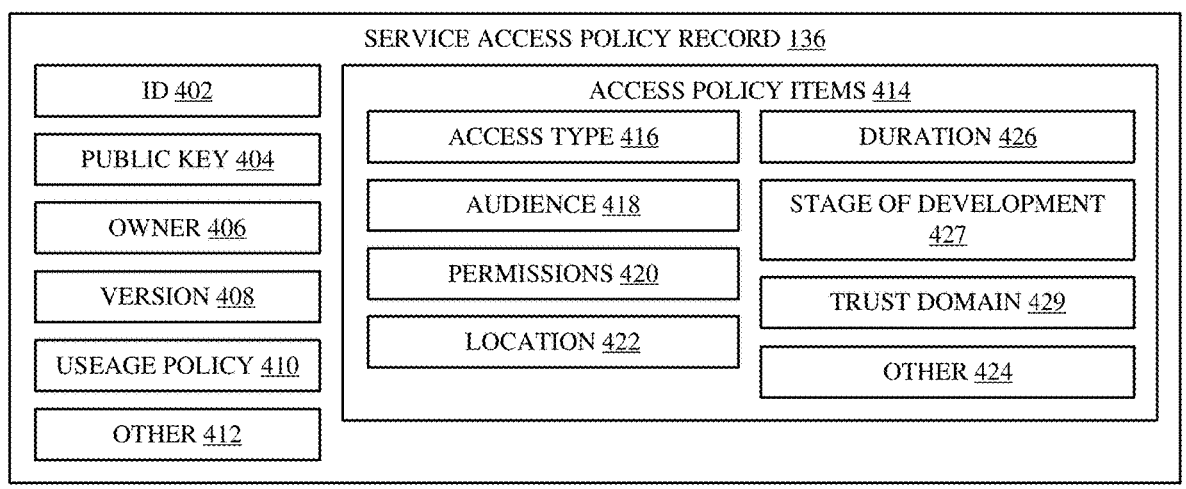
FIG. 4 shows a block diagram of one example of a service access policy record.

FIG. 3 shows a flow diagram illustrating one example of the operation of architecture 100 in implementing a token-based access restriction that restricts access to kernel 122, the various services 124 and 135 and resources 126 based on tokens issued by TIS logic 114. Is first assumed that a service operation is running as indicated by block 302. A service operation can be a number of services including an internal service, such as service 124, as indicated by block 304, an external service, as indicated by block 306 or another service 308.

During operation of a service, application logic 133 can determine that another service 124 or resource 126 needs to be accessed. This is indicated by block 310. The need for another service/resource can be for a variety of reasons. For instance, it may be that a developer is developing a feature implemented by the application 133 in service 0 and that feature is to obtain data from a resource 126 or another service 124. This is indicated by block 312. In another example, the feature is in a production environment in service 1 and the feature is invoked by an application 105 in user application domain 106. This is indicated by block 314. The access to another service or resource can be in a variety of other scenarios as well and this is indicated by block 316.

In order to access a restricted service, the requesting item (for purposes of the present discussion, it will be assumed that service 0 is requesting access to kernel 122) will request a token. In block 318, token client logic 130 of requesting service 0 thus requests a token to access the restricted service or resource (e.g., kernel 122) from TIS logic 114. This request can include an application ID 320 identifying the application making the request, target audience 322 identifying who will have access to the data generated in response to the access request, permissions 324, tenant ID 326 that identifies a tenant where the request originated, a state of development 327 (e.g., test, production, etc.) of the requesting service, signature 328 used in a public key infrastructure as well as different or other information 330.

In one example, the structural topology of the architecture can be considered in identifying a relevant access policy record 136. Therefore, the request can include an indicator 329 indicating that topology as well. For instance, TIS logic 114 can be located on the same server as the restricted service/resource. This is sometimes referred to as a Model-B topology. In another example, TIS logic 114 can be located in the same data center but on a different server than the restricted service/resource. This is sometimes referred to as Model-C topology. In another example, TIS logic 114 can be deployed outside the data center in a cloud system, which is sometimes referred to as a Model-D topology. In an example, where TIS logic 114 is deployed in a cloud system, additional information can be required in the request, for example, a proof of possession data element that proves that the requesting service holds the appropriate private key. It is to be noted that there can be several different TIS logic 114 locations and the particular location can be chosen by weighing performance and security factors or other factors. For example, an instance of TIS logic 114 can be deployed on each capacity server that serves workload capacity for the corresponding service. Each service can have access to multiple instances of TIS logic 114 located across multiple servers to prevent any central point of failure. Also, having multiple instances of TIS logic 114 across multiple servers allows token issuing to be scaled out across a datacenter or multiple datacenters. Datacenters can also be partitioned into different dimensions, logically and physically. In one example, some of the partitioning dimensions of a datacenter can be service rings/environments, service forests, tenants and/or service data availability groups. The topology of the architecture can be considered in applying access policies and issuing tokens. If an access request is made from one service ring to another, one access policy may apply. However, if an access request is made within an access ring, then a different (more or less restrictive) access policy may apply. All of these, and other scenarios are contemplated herein. The access request provided by the requesting service can include indicators of all of these items.

Once the access request (the request for a token) is received at TIS logic 114, as indicated by block 331, TIS logic 114 processes, the access request and generates a response. This is indicated by block 332. The access request can be processed in a variety of ways. For example, the access request can first be processed by filter logic 202 in AP logic 134 to identify an AP record 136 that is to be applied to the request. This is indicated by block 334. AP logic 134 may have one or more associated AP records for each requesting service which indicates what access can be requested by the service. The particular AP record 136 to be applied to the request may differ based on a plurality of different dimensions or filter criteria. For instance, filter logic 202 may filter a set of AP records based on topology, deployment structure (e.g., state of development), trust domain, etc. Filter logic 202 thus filters the various AP records 136, to identify the particular record to be applied to the request, based on the filter criteria. AP application logic 204 then checks the request against the identified AP record 136 to determine whether the request complies with the identified AP record 136. If the requesting service's request is not compliant with a corresponding AP record, (e.g., if the access request is requesting access to a function of kernel 122 or a service or resource that it does have access to according to its AP record), the request for access will be denied.

Assuming that the request was compliant with the AP 136, token issuing logic 135 issues the token to the requesting service. TIS logic 114 can also tag issued tokens with a token consumption policy 336. Token consumption policy 336 is enforced at token authentication logic 132 of the requested service/resource. This is described in more detail below. Other tagging or processing can also be completed by TIS logic 114 as indicated by block 338.

The requesting service, once it receives the token, then calls the service/resource to be accessed (e.g., the requested service/resource) and delivers the token to the requested service along with the access request. This is indicated by block 340.

Token authentication logic 132 (at the requested service/resource) receives and validates the incoming token as indicated by block 348. In another example, the token can be validated by some other logic 352 or in still other ways 354. Regardless of where the token is validated it is determined whether the token is valid. The validation can take a number of steps. For instance, the identified access policy can be applied again at token validation time. This is indicated by block 353. Applying a single access policy at both token issuing time and token validation time allows the system to decide if an early binding to an access policy, or later evaluation should be performed. For example, assume the access token was issued by a different, but trusted, issuer. Then, while the access token may have not been subject to the access policy at token issuance time, it is still subject to it at token validation time. In such a scenario, the access policy can be made available for consumption at both issuing and validation time. For instance, it can validate that there is a valid signature (based on the metadata) for TIS logic 114 that issued the token. In some instances, the token authentication logic 132 may need to request additional information from TIS logic 114 or the requesting service to enforce a token consumption policy 336. The token consumption policy may set out what is needed by a service to consume the token. For example, the service being accessed may need (and thus request) additional metadata or proof of possession of the private key of the requesting service in case the consumption policy dictates that a proof of possession is needed to consume the token. This is just one example.

After validation is performed, the access token (and thus the access request) will be determined to be either valid or invalid. This is indicated by block 355. If the token is validated, the requested access can be provided to the requesting component as indicated by block 356. In one example, the token authorizes the least privileged access (needed to perform the desired operation) to the requested service. If the token is not validated, then the requested access is denied. This is indicated by block 358.

Figure 5:
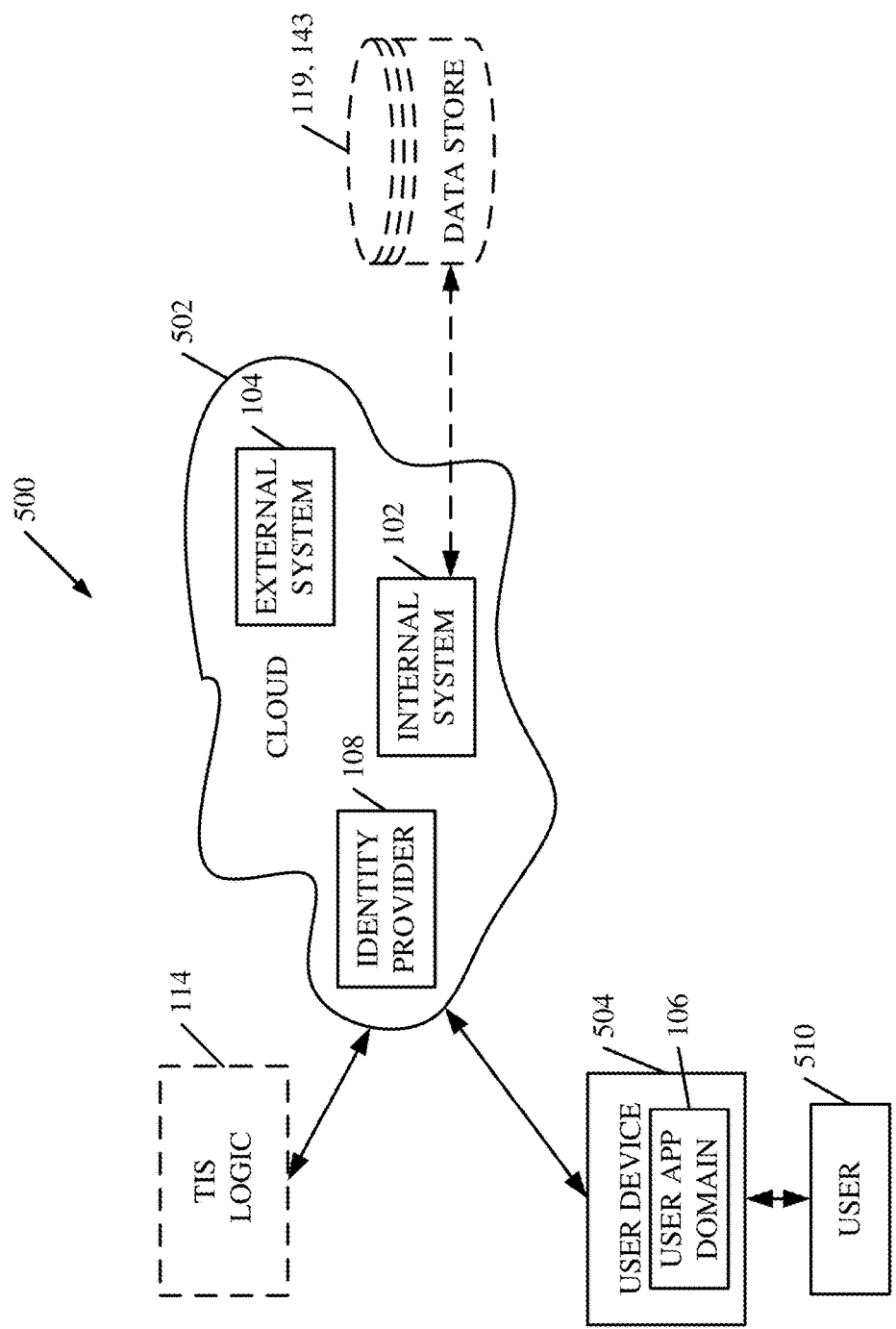
FIG. 5 is a block diagram showing the architecture illustrated in FIG. 1, deployed in a cloud computing environment.

FIG. 5 shows one example of a service access policy record 136. Service access policy record 136 can include ID 402, public key 404, owner 406, version 408, usage policy 410, and access policy items 414. Service access policy record 136 can also include other components as indicated by other 412. ID 402 identifies the service(s) that this access policy record 136 applies to. Public key 404 specifies a set of public keys used during validation of a signature on a service request along with an indicator indicating where each key group is valid. Owner 406 identifies who created this policy and/or who can modify it. Version 408 identifies the version of the access policy. Usage policy 410 dictates how the token is to be used at the requested service. For example, usage policy 410 could indicate where a token can be accepted relative to where it was issued or other contextual constraints on token acceptance, such as requiring proof of possession of the token or a key, etc.

Access policy items 414 can include access type 416, audience 418, permissions 420, scope filters 421, location 422, tenant identifier 423, duration 426, stage of development 427 and other items 424. Access policy items 414 are extensible constraints which define when this particular access policy is to be followed in issuing a token and the access (or constraints on access) granted under the policy. If the requesting service's request does not comply with the access policy it will not be issued a token.

Access type 416 can define what types of access can be permitted, for example, the types of operations that can be performed, such as read, write, read/write, etc. Audience 418 can define who is able to gain access, for example the names of allowable requesting services. Permissions 420 can define what the requester is able to do, for example administrative permissions. Scope filters 421 can define a scope of access based on data control partitioning or other logical or physical partitioning of data or services. Location 422 defines where tokens can be granted, for example, on the same server only or the same data center only. In one example location 422 is broken into 7 trust domains based on location of the requested service/resource and location of the requesting service/resource. For instance, the requested service/resource may be the kernel, on the same server (Model-B), on the same datacenter (Model-C), in a remote-cloud (Model-D), it may be from first party, second party, third party, etc. In another example, there may be fewer or greater trust domains arranged by trustworthiness of a location of the requesting and requested services/resources and/or based on an identity of the controlling party. Tenant ID 423 can be used to filter the tenants for which access tokens can be issued and the tenant data that can be accessed by a requester using that token. Duration 426 defines the duration of a token's validity, for example X minutes. Stage of development 427 defines what stage of development a requesting service must be in to be allowed to access what resources or other services. For example, a service in an early stage of development may be more restricted than a service near production launch or one that has been in production for a long time. A possible advantage of this is to prevent an early development service from accessing and potentially corrupting a system due to bugs, while allowing a latter-in-development service to access more of the system. This can be done early by adjusting the access policy to allow the service limited access to test overall compatibility with the system early on, and greater access once it is stable. Stage of development 427, in one example, is represented by a date of release. In another example, it is represented by a stage indicator indicating the stage of development of the requesting service. These are not the only access policy items that can be used and there can be many others as indicated by other 424.

A combination of access policy items 414 allows for application of different access policies on a highly granular basis. The items can be extended to include additional filter criteria so access policies can be selected or filtered based on additional criteria, by simply adding them. Further, it will be noted that, in one example, changing the values of one of the access policy items 414 can change the value of other access policy items 414. For example, if permissions 420 are increased, then duration 426 or location 422 where the permissions are valid may be decreased. Access policy items 414 can have different datatypes and in one example, the access policies adhere to the principles of application isolation, granting least needed privilege, as well as user and time constrained access grants.

It can thus be seen that the present description illustrates how access policies can be applied in a highly granular way, by including filterable criteria, in an extensible data structure, so a token issuer can select the access policy to apply, based on any or all of those criteria. This greatly enhances the security of the system because access can be tailored to specific scenarios based on the applicable filter criteria. Similarly, in one example, by distributing the system so there is a token issuer (an instance of TIS logic 114) and an instance of token authentication logic 132 on each capacity machine (or server) that services access requests, there is no central point of failure so the system is more robust. Also, because the instances of logic 114 and 132 increase with capacity, new services can be on-boarded very quickly.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that internal computing system 102, external computing system 102 and identity provider 108 can be located in cloud 902 (which can be public, private, or a combination where portions are public while others are private). Therefore, user 510 uses a user device 504 to access systems 102 through cloud 502.

FIG. 5 also depicts another example of a cloud architecture. FIG. 5 shows that it is also contemplated that some elements of system 102 can be disposed in cloud 902 while others are not. By way of example, data stores 119, 143 can be disposed outside of cloud 502, and accessed through cloud 502. In another example, TIS logic 114 can be outside of cloud 502. Regardless of where they are located, they can be accessed directly, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
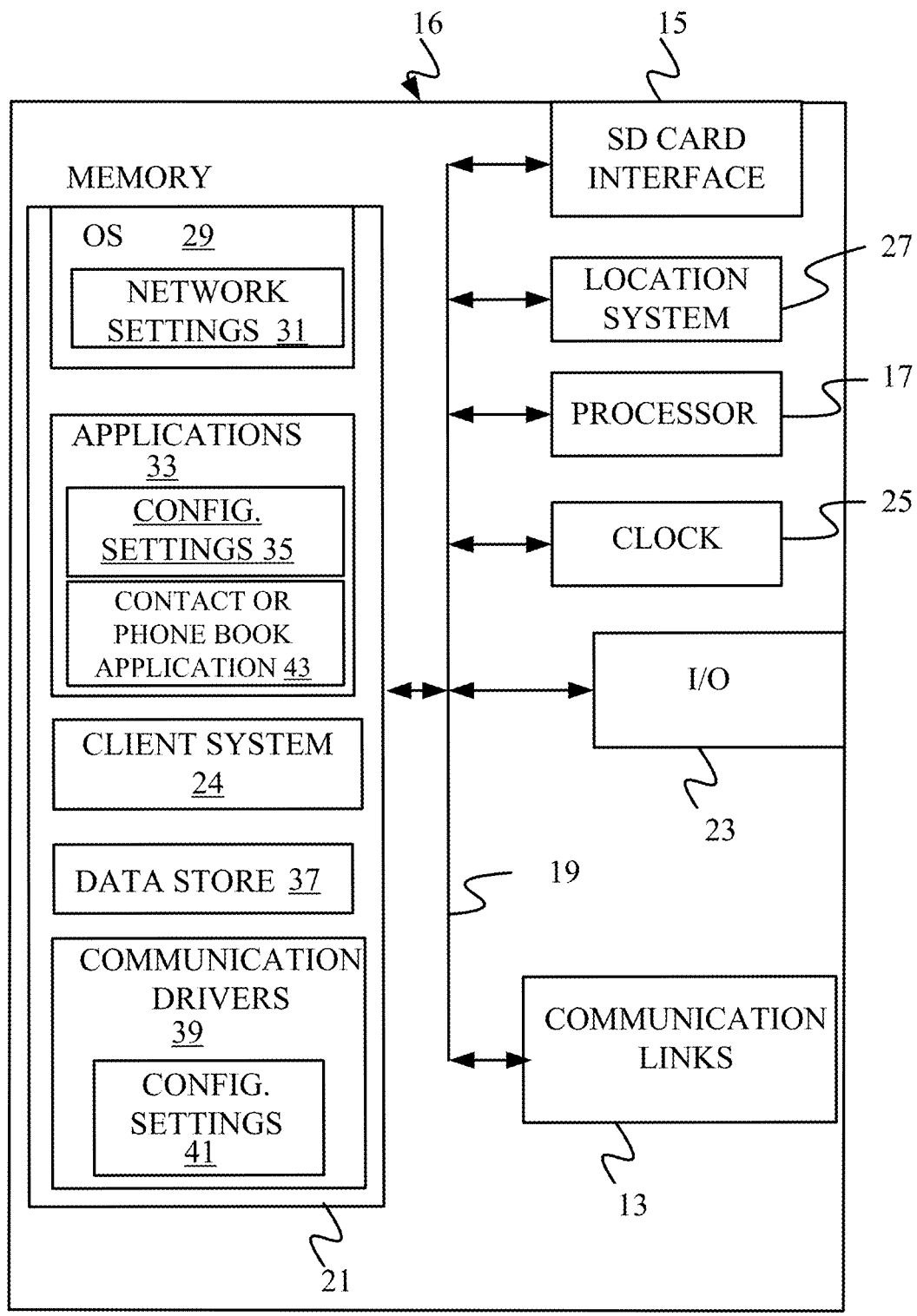
FIGS. 6-8 show examples of mobile devices.
Figure 7:
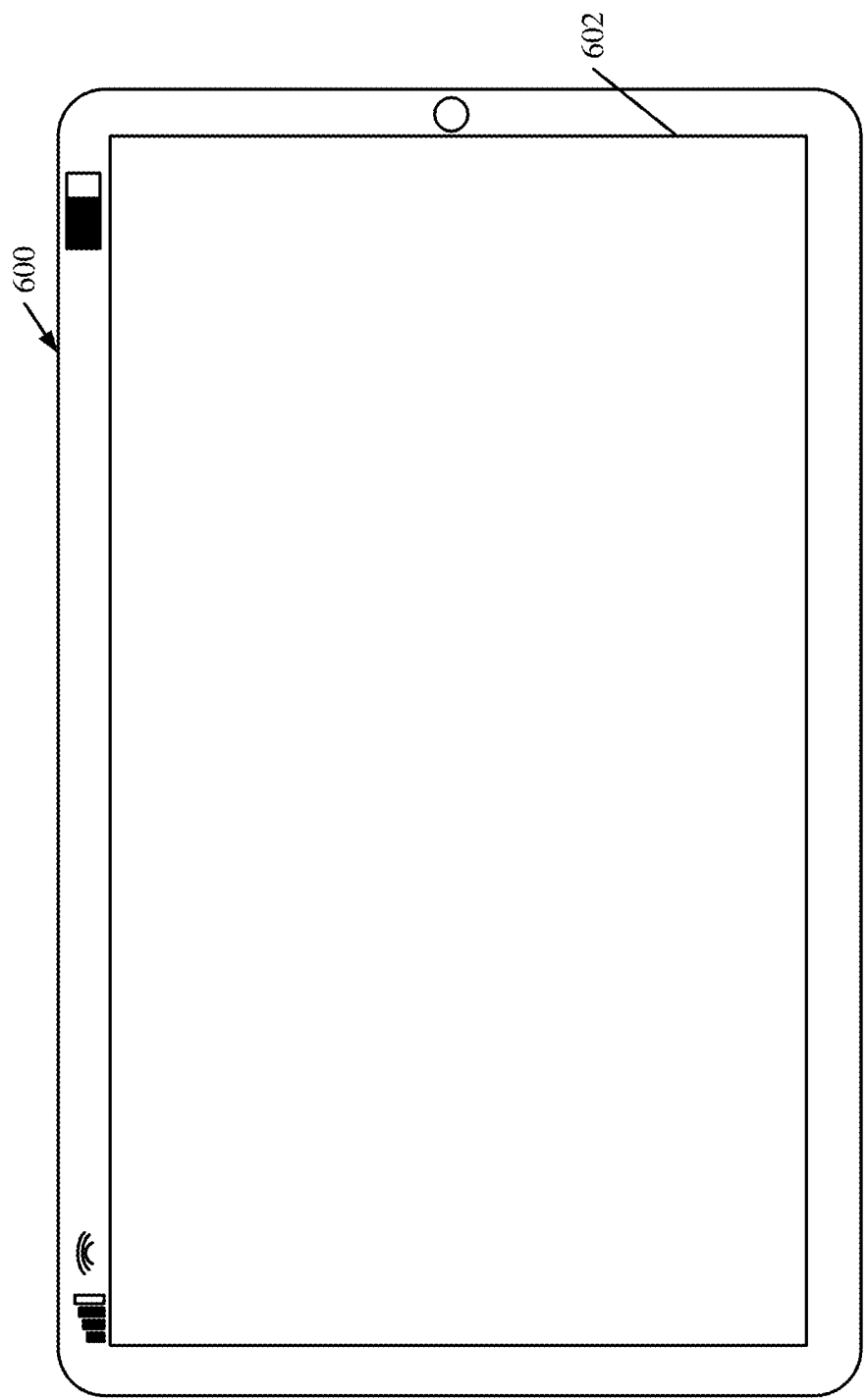
Figure 8:
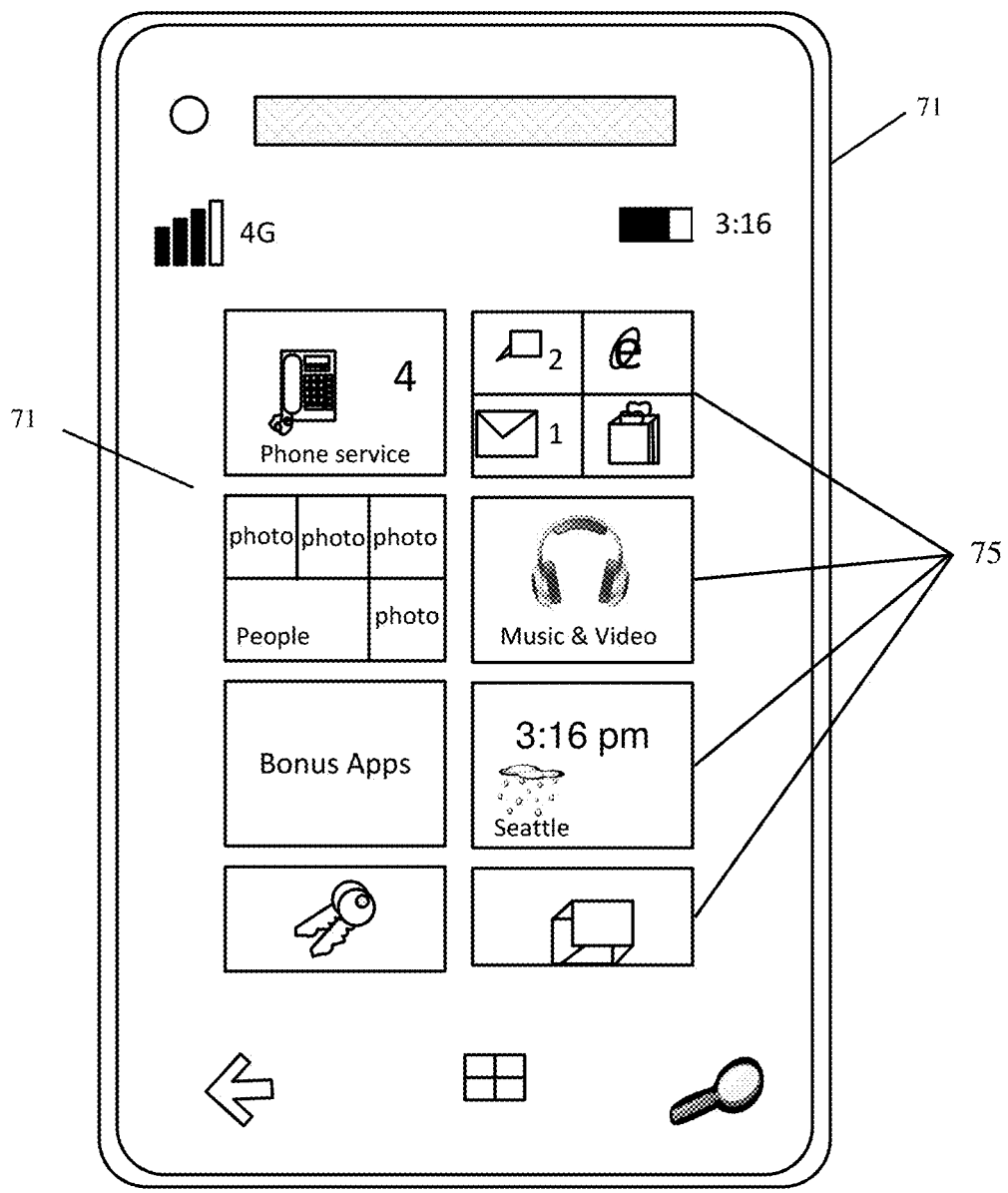

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as WI-FI protocols, and BLUETOOTH protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 1100. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1100 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
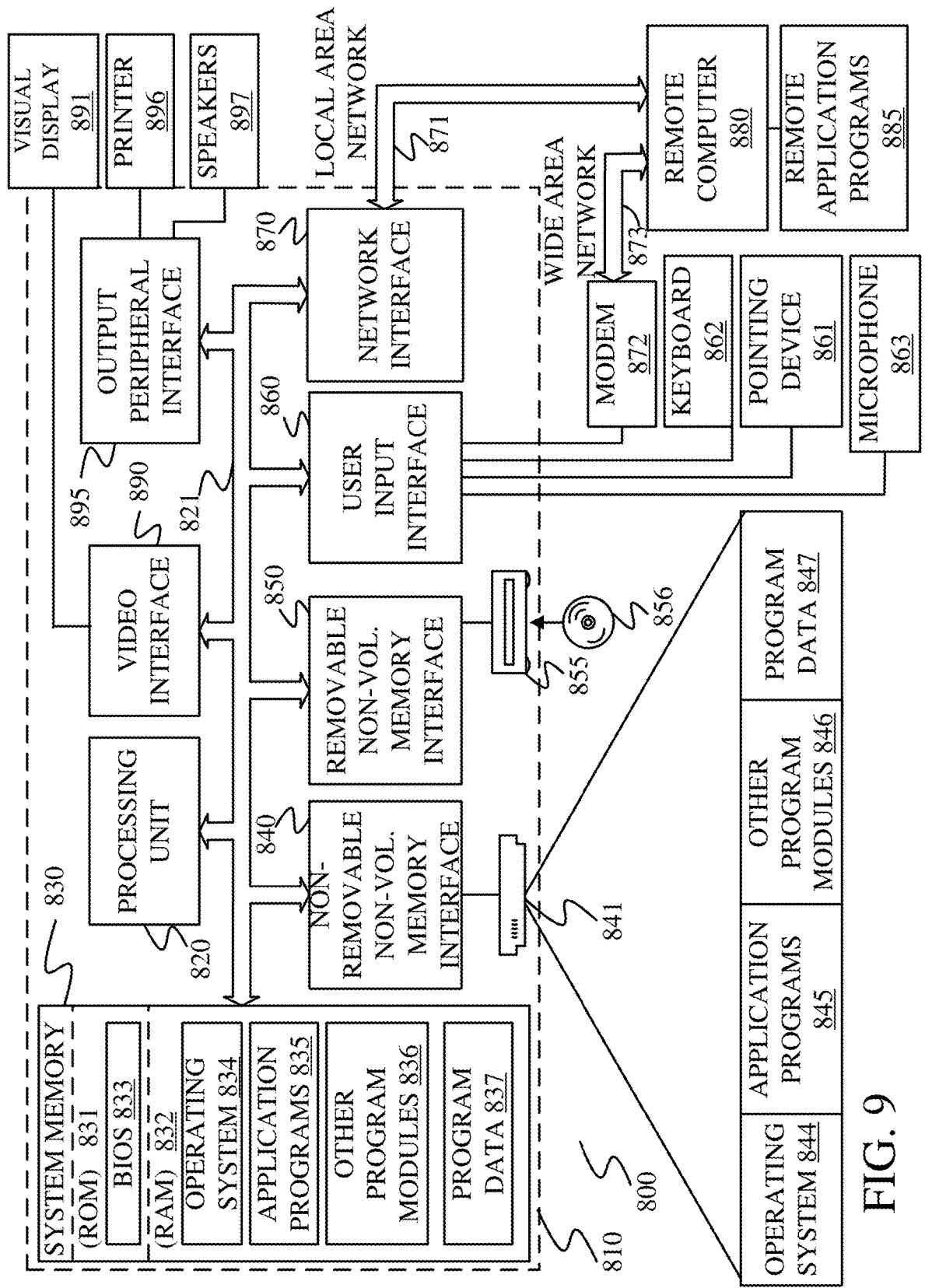
FIG. 9 shows one example of a computing environment that can be part of, or be used with, the architectures shown in the previous FIGS.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

access policy logic that receives an access request from a requesting service, requesting access to a requested component, and identifies an access policy, of a plurality of different access policies, that is applied to the access request of the requesting service, based on a set of filter criteria, the access policy logic determining, based on the identified access policy and the access request, whether the access request complies with the identified access policy; and token issuing logic that issues an access token to the requesting service in response to the access policy logic determining that the access request complies with the identified access policy.

Example 2 is the computing system of any or all previous examples and further comprising the requesting service and wherein the requesting service is configured to send the access request, along with the access token, to the requested component to obtain access to the requested component.

Example 3 is the computing system of any or all previous examples and further comprising the requested component, the requested component comprising:

application logic configured to service the access request.

Example 4 is the computing system of any or all previous examples wherein the requested component further comprises:

token authentication logic configured to receive the access token and authenticate the access token and generate an authentication indication to the application logic, the application logic being configured to permit access to the requested component based on receiving the authentication indication.

Example 5 is the computing system of any or all previous examples and further comprising:

a plurality of capacity servers; and a plurality of services, including the requesting service, each of the plurality of services being deployed on a capacity server.

Example 6 is the computing system of any or all previous examples wherein each of the plurality of capacity servers comprises:

an instance of the token authentication logic.

Example 7 is the computing system of any or all previous examples wherein the access policy logic comprises:

policy filtering logic that identifies the access policy to apply to the access request by filtering items in the access policy based on a set of filter criteria.

Example 8 is the computing system of any or all previous examples wherein the access policy logic comprises:

policy application logic that applies the identified access policy to the access request to determine whether access to the requested component, in the access request, is consistent with access allowed by the identified access policy.

Example 9 is the computing system of any or all previous examples wherein the requesting service is deployed at one of a plurality of development stages, identified in the access request provided to the access policy logic, the policy filtering logic is configured to filter the plurality of access policies, based on the one of the plurality of development stages, to identify the access policy.

Example 10 is the computing system of any or all previous examples wherein the requesting service is deployed in one of a plurality of different topological structures, identified in the access request provided to the access policy logic, the policy filtering logic is configured to filter the plurality of access policies, based on the one of the plurality of different topological structures, to identify the access policy.

Example 11 is the computing system of any or all previous examples wherein the requesting service is deployed at one of a plurality of different trust domains, identified in the access request provided to the access policy logic, the policy filtering logic is configured to filter the plurality of access policies, based on the one of the plurality of different trust domains, to identify the access policy.

Example 12 is a computer implemented method, comprising:

receiving an access request from a requesting service, requesting access to a requested component;

identifying an access policy, of a plurality of different access policies, that is applied to the access request of the requesting service, based on a set of filter criteria;

determining, based on the identified access policy and the access request, whether the access request complies with the identified access policy; and issuing an access token to the requesting service in response to determining that the access request complies with the identified access policy.

Example 13 is the computer implemented method of any or all previous examples and further comprising:

sending the access request, along with the access token, from the requesting service to the requested component to obtain access to the requested component.

Example 14 is the computer implemented method of any or all previous examples and further comprising:
receiving the access token at the requested component;
authenticating the access token;
generating an authentication indication; and
providing access to the requested component based on the authentication indication.

Example 15 is the computer implemented method of any or all previous examples wherein identifying the access policy comprises:
filtering items in the access policy based on a set of filter criteria.

Example 16 is the computer implemented method of any or all previous examples wherein determining whether the access request complies with the access policy comprises:
applying the identified access policy to the access request to determine whether access to the requested component, in the access request, is consistent with access allowed by the identified access policy.

Example 17 is the computer implemented method of any or all previous examples wherein the requesting service is deployed at one of a plurality of development stages, identified in the access request and wherein filtering items in the access policy comprises:
filtering the plurality of access policies, based on the one of the plurality of development stages, to identify the access policy.

Example 18 is the computer implemented method of any or all previous examples wherein the requesting service is deployed in one of a plurality of different topological structures, identified in the access request and wherein filtering items in the access policy comprises:
filtering the plurality of access policies, based on the one of the plurality of different topological structures, to identify the access policy.

Example 19 is the computer implemented method of any or all previous examples wherein the requesting service is deployed at one of a plurality of different trust domains, identified in the access request and wherein filtering items in the access policy comprises:
filtering the plurality of access policies, based on the one of the plurality of different trust domains, to identify the access policy.

Example 20 is a computing system, comprising:
a requested component;
a requesting service that generates an access request to request access to the requested component;
access policy logic that receives the access request from the requesting service and identifies an access policy, of a plurality of different access policies, that is applied to the access request of the requesting service, based on a set of filter criteria, the access policy logic determining, based on the identified access policy and the access request, whether the access request complies with the identified access policy; and
token issuing logic that issues an access token to the requesting service in response to the access policy logic determining that the access request complies with the identified access policy, the requesting service being configured to send the access request, along with the access token, to the requested component to obtain access to the requested component.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A server computing system, comprising:
a processor; and
memory storing instructions executable by the processor, wherein the instructions, when executed, cause the server computing system to:
receive a call from a user application domain over a communication network, wherein the call invokes a first hosted service of a plurality of hosted services that are hosted by the server computing system;
identify a requested component, to be invoked by the first hosted service, to service the call from the user application domain;
send, from the first hosted service, an access request to a token issue service that requests access by the first hosted service to the requested component;
receive an access token from the token issue service, wherein the access token is
based on an access policy identified by the token issue service based on a filter criterion that corresponds to the access request, and
configured to authorize the first hosted service to access the requested component; and
send, to the requested component, the access request with the access token.

2. The server computing system of claim 1 wherein the access request sent from the first hosted service identifies an application in the user application domain.

3. The server computing system of claim 1, wherein requested component includes application logic configured to receive and service the access request.

4. The server computing system of claim 3 wherein the instructions cause the computing system to send the access request with the access token to token authentication logic that is associated with the requested component and configured to:
receive the access token;
authenticate the access token; and
generate an authentication indication indicative of the authentication to the application logic, the application logic being configured to permit access to the requested component based on receiving the authentication indication.

5. The server computing system of claim 4 and further comprising:
a plurality of capacity servers; and
a plurality of services, including the requesting-first hosted service, each of the plurality of services being deployed on a capacity server, of the plurality of capacity servers.

6. The server computing system of claim 5 wherein each of the plurality of capacity servers comprises:
an instance of the token authentication logic.

7. The server computing system of claim 4 wherein the access policy to apply to the access request is identified by the token issue service by filtering items in the access policy based on the filter criterion.

8. The server computing system of claim 7 wherein the token issue service is configured to apply the identified access policy to the access request to determine whether access to the requested component, in the access request, is consistent with access allowed by the identified access policy.

9. The server computing system of claim 7 wherein the first hosted service is deployed at one of a plurality of development stages, identified in the access request provided to the token issue service, and the token issue service is configured to filter the plurality of access policies, based on the one of the plurality of development stages, to identify the access policy.

10. The server computing system of claim 7 wherein the first hosted service is deployed in one of a plurality of different topological structures, identified in the access request provided to the token issue service, and the token issue service is configured to filter the plurality of access policies, based on the one of the plurality of different topological structures, to identify the access policy.

11. The server computing system of claim 7 wherein the first hosted service is deployed at one of a plurality of different trust domains, identified in the access request provided to the token issue service, and the token issue service is configured to filter the plurality of access policies, based on the one of the plurality of different trust domains, to identify the access policy.

12. The server computing system of claim 5, wherein the token issue service is configured to filter the plurality of access policies based on workload capacity associated with one or more of the capacity servers.

13. A computer implemented method, comprising:
receiving, from a first hosted service of a plurality of hosted services that are hosted on a server, an access request that
corresponds to a call, from a user application domain, to invoke the first hosted service, and
requests access to a requested component to service the call from the user application domain;
defining a filter criterion based on the access request;
selecting an access policy by filtering a plurality of different access policies using the filter criterion;
applying the selected access policy to the access request of the first hosted service;
determining, based on the identified access policy and the access request, that the access request complies with the identified access policy; and
sending an access token, that corresponds to the access request, to the first hosted service in response to determining that the access request complies with the identified access policy, wherein the access token is configured to authorize the first hosted service to access the requested component.

14. The computer implemented method of claim 13 and further comprising:
sending the access request, along with the access token, from the first hosted service to the requested component to obtain access to the requested component.

15. The computer implemented method of claim 14 and further comprising:
receiving the access token at the requested component;
authenticating the access token;
generating an authentication indication; and
providing access to the requested component based on the authentication indication.

16. The computer implemented method of claim 15 wherein identifying the access policy comprises:
filtering items in the access policy based on a filter criterion.

17. The computer implemented method of claim 16 wherein determining whether the access request complies with the access policy comprises:
applying the identified access policy to the access request to determine whether access to the requested component, in the access request, is consistent with access allowed by the identified access policy.

18. The computer implemented method of claim 17 wherein the first hosted service is deployed at one of a plurality of development stages, identified in the access request and wherein filtering items in the access policy comprises:
filtering the plurality of access policies, based on the one of the plurality of development stages, to identify the access policy.

19. The computer implemented method of claim 17 wherein the first hosted service is deployed in one of a plurality of different topological structures, identified in the access request and wherein filtering items in the access policy comprises:
filtering the plurality of access policies, based on the one of the plurality of different topological structures, to identify the access policy.

20. A computing system, comprising:
at least one processor; and
memory storing instructions executable by the processor, wherein the instructions, when executed, provide:
a communication component configured to communicate with a user application domain, that is remote from the computing system, over a network;
hosted service that is hosted by the computing system remote from the user application domain and configured to:
receive a call from the user application domain that invokes the hosted service;
identify a requested component, to be invoked by the hosted service, to service the call from the user application domain; and
generate an access request to request access to the requested component;
access policy logic configured to:
receive the access request from the hosted service; and
identify an access policy, of a plurality of different access policies, that is applied to the access request of the hosted service, based on a filter criterion;
based on the identified access policy and the access request, determining whether the access request complies with the identified access policy; and
token issuing logic configured to:
issue an access token to the hosted service in response to the access policy logic determining that the access request complies with the identified access policy,
wherein the hosted service is configured to send the access request, along with the access token, to the requested component to obtain access to the requested component.

* * * * *